United States Patent [19]

van der Lely

[11] Patent Number: 4,512,433
[45] Date of Patent: Apr. 23, 1985

[54] ROW-CROP FRONT AND REAR WHEEL DRIVE ARTICULATED TRACTOR FOR HEAVY-DUTY OPERATIONS

[76] Inventor: Cornelis van der Lely, 7, Brüschenrain, Zug, Switzerland

[21] Appl. No.: 394,101

[22] Filed: Jun. 28, 1982

Related U.S. Application Data

[60] Continuation of Ser. No. 128,933, Mar. 10, 1980, Pat. No. 4,368,797, which is a division of Ser. No. 894,153, Apr. 6, 1978, Pat. No. 4,206,825, which is a continuation of Ser. No. 653,514, Jan. 29, 1976, abandoned.

[51] Int. Cl.³ .............................................. B60K 17/30
[52] U.S. Cl. ........................................ 180/235; 180/900; 296/190
[58] Field of Search ............... 180/235, 265, 134, 135, 180/136, 137, 138, 139, 900; 280/5 A, 5 R, 503; 296/190

[56] References Cited

U.S. PATENT DOCUMENTS

| | | | |
|---|---|---|---|
| 1,623,214 | 4/1927 | Storey | 180/235 |
| 2,187,425 | 1/1940 | Johnston | 180/900 |
| 2,296,859 | 9/1942 | Tourneau | 280/5 R |
| 2,674,468 | 4/1954 | Boll et al. | 280/503 |
| 3,061,376 | 10/1962 | Barenyi | 296/190 |
| 3,582,132 | 6/1971 | Gunning | 296/190 |
| 3,851,895 | 12/1974 | Davis | 180/235 |
| 4,206,825 | 6/1980 | van der Lely | 180/900 |
| 4,368,797 | 1/1983 | van der Lely | 180/900 |

FOREIGN PATENT DOCUMENTS 761431 11/1956 United Kingdom ................ 180/235

Primary Examiner—Joseph F. Peters, Jr.
Assistant Examiner—Ross Weaver
Attorney, Agent, or Firm—Penrose Lucas Albright

[57] ABSTRACT

An articulated agricultural tractor of 100 horsepower or more having front and rear portions connected by an articulation joint, there being only one axle in each portion. The articulation joint is located just inside a vertical plane tangent to the rear treads of the front wheels mounted on the front axle. The engine and its casing are mounted completely forward of the front axle. Each axle carries four wheels with pneumatic tires mounted thereon, all wheels being of the same diameter. The tractor's body is relatively narrow. The operator's cab is located directly over the rear axle and is sufficiently wide that the operator can see rows just inside all of the front wheels. A three-point lifting device and towing bar extend rearwardly from the rear portion with the lifting device's lower links or those of the bar part extending normally outwardly relative to the tractor's body in the vicinity of adjacent central tires. The distance between the front and rear tires is about one-half the diameter of each tire. A ladder for the operator to climb into the operator's cab is affixed to the cab between the wheels as seen in side elevation. Fuel tanks are mounted on the housing for the engine forward of the front axle, each fuel tank being triangular as seen from above. The lower parts of the differentials for both axles and the engine are at substantially the same level.

81 Claims, 9 Drawing Figures

ROW-CROP FRONT AND REAR WHEEL DRIVE ARTICULATED TRACTOR FOR HEAVY-DUTY OPERATIONS

RELATED APPLICATION

This is a continuation of application Ser. No. 128,933 filed Mar. 10, 1980, now U.S. Pat. No. 4,368,797, which is a division of application Ser. No. 894,153, filed Apr. 6, 1978, and issued as U.S. Pat. No. 4,206,825 June 10, 1980, which was a continuation of application Ser. No. 653,514 filed Jan. 29, 1976, now abandoned.

SUMMARY OF THE INVENTION

The invention relates to a row-crop, front and rear wheel drive articulated tractor of relatively high horsepower (100 hp and above) which includes an engine which is located in a housing forward of the axle for the front wheels, and a frame having a front frame portion and a rear frame portion which are connected by an articulation joint. Each frame portion has a single horizontal axle upon which four wheels with pneumatic tires of equal diameter are mounted. The articulation joint has a substantially vertical pivot axis about which the front and rear frame portions are relatively pivotable. An operator's control center, which comprises a seat and controls in a cab which is wider than the engine housing is mounted to the rear of the articulation joint and directly vertically above the rear axle to improve the operator's capacity to handle the tractor and equipment connected thereto. The distance between the wheels is about one-half the diameter of the wheels and the disposition of the engine, axles, wheels, operator's control center and a lifting device extending from the rear are such as to enhance the operator's visibility and handling of the tractor and the tractor's weight distribution and traction. With four tires on each axle and the tractor's weight distribution, wheel slippage and soil compaction are both reduced. The location of the engine and the front fuel tanks provide a somewhat larger percentage of the tractor's weight on the front portion which, however, tends to be offset, to achieve a front-rear optimum weight distribution, due to the weight and force required to move equipment attached to the rear lifting and tow device.

For a better understanding of the invention, and to show how the same may be carried into effect, reference will now be made, by way of example, to the accompanying drawings, in which:

DESCRIPTION OF THE PREFERRED EMBODIMENTS

Figure 1:
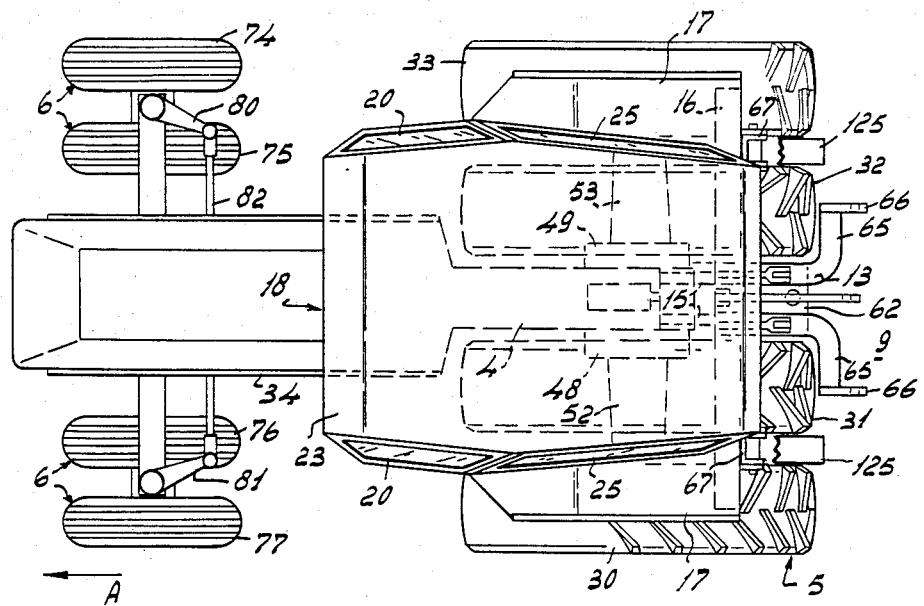
FIG. 1 is a plan view of an agricultural tractor in accordance with the invention.

Referring to FIGS. 1 to 6 of the drawings, those Figures illustrate an agricultural tractor but it is emphasized that this is purely by way of example and that the invention is equally applicable to a tractor that is intended for non-agricultural purposes. The tractor has a frame that is generally indicated by the reference numeral 1, said frame 1 comprising a substantially horizontal beam 2 that is substantially parallel to the intended direction of forward travel of the tractor as indicated by an arrow A in FIGS. 1 and 2 of the drawings. The rear end of the frame beam 2 with respect to the direction A is secured to the housing of a torque converter 3 whose rear, in turn, is secured to the housing 4 of a differential. The output shafts of the differential carry rear driven ground wheels 5 whose arrangement will be described in greater detail below. Smaller front ground wheels 6 are indirectly connected to the frame beam 2 near the leading end of that frame beam in a manner which will also be described in greater detail below. The tractor has an engine 7 which, in the example that is being described, is an internal combustion engine rated at not less than substantially 100 horsepower, said engine 7 being mounted on top of the frame beam 2 at a location in front of the torque converter 3 so as to lie at a horizontal level above that of the tops of the front ground wheels 6 with at least part of the engine as far advanced in the direction A as are the front ground wheels 6.

A hydraulic mechanism 8 which operates a rear-mounted three-point lifting device or hitch 9 of the tractor is arranged on top of the differential housing 4 at substantially the rear of that housing with respect to the direction A. The lifting device or hitch 9 comprises two upper arms 10 that are located alongside one another in horizontally spaced apart relationship, the arms 10 being turnable upwardly and downwardly about the aligned axes of corresponding shafts 11. The aligned axes of the two shafts 11 extend substantially horizontally perpendicular to the direction A and are turnable by the hydraulic mechanism 8, in a manner that is known per se, to raise or lower the upper arms 10 as may be required. The free rearmost ends of the upper arms 10 are pivotally connected to the upper ends of corresponding rods 12, the lower ends of those rods being pivotally connected, in turn, to lugs that are located between the ends of corresponding lower lifting links 13. In the embodiment which is being described, said lugs are disposed substantially midway along the lengths of the two lower lifting links 13. The leading ends of the links 13, with respect to the direction A, are turnably connected by substantially horizontally aligned pivot pins 14 to lugs that are carried by the differential housing 4, the axis that is defined by the pivot pins 14 being substantially perpendicular to the direction A.

The top of a housing of the hydraulic mechanism 8 carries a pair of substantially symmetrically identical supports 15 which supports extend obliquely upwardly and rearwardly away from said housing to terminate at a height above ground level which is substantially equal in magnitude to the diameter of one of the rear driven ground wheels 5. The upper rear ends of the two supports 15 are rigidly interconnected by a horizontally disposed beam 16 which extends substantially perpendicular to the direction A throughout nearly the whole width of the tractor (see FIG. 1). As seen in plan view (FIG. 1), the beam 16 is located behind the common axis of rotation of the rear driven ground wheels 5, said beam 16 supporting a platform 17 that extends forwardly therefrom relative to the direction A. The platform 17 forms part of the bottom of a driving cabin 18. A rear portion of the platform 17 is substantially horizontally disposed but, at a location which is just in front of the common axis of rotation of the rear ground wheels 5 with respect to the direction A, the platform is bent over obliquely downwardly and, at its front, forms a lower cabin floor portion 19 at the foot of opposite side doors 20 of the cabin. A front wall 21 of the driving cabin 18 has a large central window (FIG. 3) and is located immediately in front of the leading hinged edges of the two side doors 20, those doors 20 also being provided with windows throughout most of their respective areas. Access ladders 22 that each comprise four rungs are arranged beneath the two side doors 20 with the upper rungs thereof at substantially the level of the lower cabin floor portion 19. The upper edge of the front wall 21 of the cabin 18 is connected to a cabin roof 23 and the rear edge of said cabin roof is connected to a rear wall 24 of the cabin. The side doors 20 of the cabin 18 are located in side walls 25 thereof and it will be noted from the drawings that the rear wall 24 and side walls 25, like the side doors 20 and the front wall 21, are provided with windows throughout the greater parts of their respective areas.

A frame 26 is located inside the driving cabin 18 and carries a driving seat 27, a steering wheel 28 and other control members for the operation of the tractor. The platform 17 carries an upright pivot 29 and the frame 26, together with the parts which it carries, is turnable around the pivot 29 on the platform 17 between the position illustrated in FIG. 2 of the drawings in which a person occupying the seat 27 will face forwardly in the direction A and an alternative position, that is turned through 180° about the axis of the pivot 29, the alternative position being such that a person occupying the seat 27 will face rearwardly with respect to the direction A and towards the window in the rear wall 24 of the cabin 18. Means that is not illustrated in the drawings is provided to enable the frame 26 to be retained in either of the two alternative positions about the pivot 29 that have just been described. As seen in plan view, the whole of the frame 26 is located behind the lower cabin floor portion 19, with respect to the direction A, in either of the two alternative positions of use thereof. The driving cabin 18 has a width which is preferably not less than 1.5 meters and not greater than 1.8 meters and, with such a transverse dimension, that part of the interior of the cabin 18 that is disposed between the side doors 20 is sufficient to accommodate a person standing upright where the view of the driver occupying the seat 27 will not be impeded in substantially the direction A to any disadvantageous extent. The distance between the lower cabin floor portion 19 and the cabin roof 23 is great enough to enable anyone who is not unusually tall to stand without stopping and, if such a person stands to the side with respect to the direction A, his interference with the driver's view in that direction will be at a minimum. The driving seat 27 is located wholly above the level of the tops of the rear driven ground wheels 5 and the lower cabin floor portion 19 is located immediately above the top of the differential housing 4, such portion being spaced above ground level by a distance which is substantially 75% of the diameter of one of the rear driven ground wheels 5.

There is, in fact, a row of four of the rear driven ground wheels 5 which are individually designated in the drawings by the references 30, 31, 32 and 33. The four wheels 30 to 33 are arranged in two pairs that are disposed at opposite sides of a vertical plane of substantial symmetry of the tractor which extends in the direction A. The four rear wheels 30 to 33 all form part of the original equipment of the tractor, that is to say, none of them is furnished as an "optional extra". The pair of wheels 30 and 31 that is located at one side of the imaginary plane of substantial symmetry of the tractor that has been referred to above has the two wheels rigidly secured to one another and the same is true of the two wheels 32 and 33 of the pair located at the opposite side of the imaginary plane. Due to the provision of the differential which will be described in greater detail below, the pair of wheels 30/31 or 32/33 that is at the outer convex side of a bend negotiated by the tractor during its travel can rotate at a faster speed than the other pair disposed at the inner concave side of that bend. The overall width of the row of four wheels 30 to 33 in a horizontal direction that is substantially perpendicular to the direction A is preferably not greater than 3.0 meters and, in the embodiment which is being described, said width has a magnitude of substantially 2.5 meters. Each of the wheels 30 to 33 has a pneumatic tire whose tread width in the same direction as that which has just been mentioned is preferably not less than 35 centimeters and not more than 50 centimeters, a tread width of substantially 45 centimeters being advantageous. The spacing between the tires of the wheels 30 and 31 of one pair and between the tires of the wheels 32 and 33 of the other pair is preferably substantially 15 centimeters. The distance between the pneumatic tires of the two inner wheels 31 and 32 of the two pairs should not be more than 50 centimeters and a magnitude of between 20 centimeters and 40 centimeters inclusive is preferred. In the embodiment which is being described, the distance in question is substantially 40 centimeters. Each of the four wheels 30 to 33 has an overall diameter which should not be less than 1 meter and which is advantageously between 1.4 and 1.8 meters. In the embodiment which is being described, each of the wheels 30 to 33 has an overall diameter of substantially 1.5 meters. It will be seen from FIG. 2 of the drawings that the driving seat 27 in the cabin 18 is located substantially vertically above the common axis of rotation of the four wheels 30 to 33.

As seen in plan view (FIGS. 1 and 6), the width of the frame 1 varies significantly lengthwise therealong. The parts thereof that are located in front of the rear driven ground wheels 5 (said parts comprising the beam 2, the torque converter 3, the engine 7 and cover plates and the like 34 therefor) have a width that is substantially the same as the distance between a vertical plane of symmetry of the wheel 31 that extends in the direction A and a similar plane in respect of the wheel 32. The parts of the frame 1 that are located to the rear of the torque converter 3, with respect to the direction A, are of significantly less width than are the parts disposed in front of the differential housing 4, the latter being the principal or only component of the parts now under consideration. The width of the rear parts of the frame 1 is between substantially 30 and substantially 45 centimeters inclusive and a width of substantially 35 centimeters is preferred so that said parts can fit, as illustrated in the drawings, between the rear wheels 31 and 32 with sufficient working clearance from those wheels.

Figure 6:
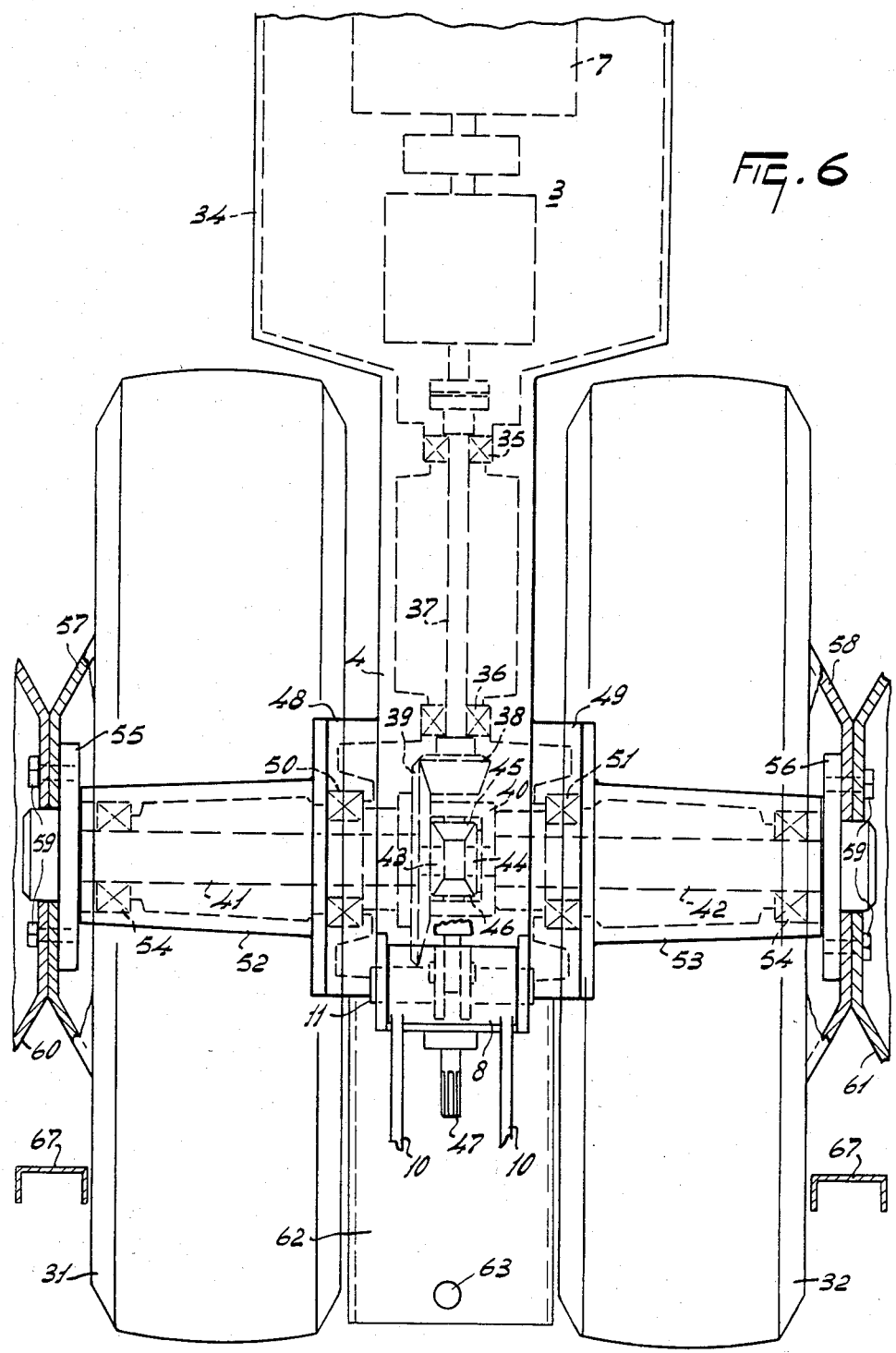
FIG. 6 is a partial sectional plan view, to an enlarged scale as compared with FIGS. 1 to 4, of a rear central region of the tractor of FIGS. 1 to 5.

FIG. 6 of the drawings shows that the cover plates or the like 34 for the torque converter 3 and the engine 7 are located, together with said torque converter 3 and engine 7, in front of the foremost extremities of the rear wheels 31 and 32 with respect to the direction A. It is noted that the term "torque converter" is used in a generic sense and is intended to include within its scope such a mechanism as a manually changeable gear box. The cover plates or the like 34 are closer to one another, relative to the part of the frame 1 that has just been discussed, in the part of the frame that is disposed between the rear wheels 31 and 32, the spacing therebetween becoming narrower from a region of the frame that is located approximately in register (as seen in plan view—FIG. 6) with the foremost extremities of the wheels 31 and 32 relative to the direction A. The cover plates or the like 34 support, between the wheels 31 and 32, substantially horizontally aligned bearings 35 and 36 that are spaced apart from one another in the direction A. The bearings 35 and 36 rotatably support an output or driving shaft 37 of the torque converter 3, the shaft 37 carrying, immediately behind the rear bearing 36, a bevel pinion 38. The teeth of the pinion 38 are in driving mesh with those of a crown wheel 39, the crown wheel 39 being rigid with a rotatable housing 40 in which substantially horizontally aligned output or half shafts 41 and 42 have their inner ends rotatably journalled. The inner ends of the two shafts 41 and 42 carry, inside the housing 40, corresponding bevel pinions 43 and 44, the teeth of both those pinions 43 and 44 being in mesh with the teeth of smaller bevel pinions 45 and 46 that are rotatably mounted in the housing 40, between the pinions 43 and 44, so as to be capable of revolving about a common axis which is rotatably displaceable with the housing but which is always perpendicular to the axis of rotation of the output or half shafts 41 and 42. It will be realized from the description that has just been given and from FIG. 6, in particular, of the drawings that the differential is of generally known construction.

The shaft 47 extends substantially horizontally beneath the output or driving shaft 37 in substantially parallel relationship with that shaft, said shaft 47 being rotatably supported by bearings at appropriate locations in the differential housing 4. The shaft 47 projects from the rear of the housing 4 to form a rear power take-off shaft of the tractor at which point it is splined or otherwise keyed to enable it to transmit drive to the working parts of various rear-mounted tools and implements. The power take-off shaft 47 is driven from the output side of the torque converter 3 and its speed of rotation relative to that of the engine 7 is therefore dependent upon the gear ratio selected at any particular time. It should be noted that it is possible for the shaft 47 to be driven directly from the engine 7 in which case its speed of rotation at any particular time will be the same as that of the output shaft of the engine 7. The differential housing 4 is formed with substantially symmetrical lateral projections 48 and 49 whose centers are substantially coincident with the common longitudinal axis (axis of rotation) of the shafts 41 and 42. The projections 48 and 49 accommodate large substantially horizontal bearings 50 and 51 for intermediate regions of the shafts 41 and 42. Projections 48 and 49 have flanges at the inner ends of gently outwardly tapering axis supports 52 and 53 rigidly secured to them and it will be seen from FIG. 6 of the drawings that outer end regions of the two axle supports 52 and 53 receive further substantially horizontal bearings 54 for corresponding regions of the shafts 42 and 41. The axle supports 52 and 53 are of hollow construction and the output or half shafts 41 and 42 which they rotatably support, with the aid of the bearings 50/51 and 54, have circular discs 55 and 56 rigidly secured to them in such a way that the general planes of the discs 55 and 56 are perpendicular to the common longitudinal axis of rotation of the two shafts 41 and 42. It will be noted that the rear wheels 31 and 32 are arranged around the axle supports 52 and 53 respectively, said wheels 31 and 32 having hub portions 57 and 58 which are disposed at the sides of those wheels remote from the differential housing 4 and which are releasably secured to the corresponding discs 55 and 56 by bolts 59.

The described and illustrated construction whereby the portions 57 and 58 of the hubs of the two wheels 31 and 32 project outwardly from the general planes of corresponding sides of those wheels is a substantially conventional one for tractors and, with commercially available tractor wheels, the perpendicular distance between the outermost flat substantially annular surface of each hub portion 57 or 58 and the general plane of the neighbouring side of the wheel 31 or 32 concerned is substantially 7.5 centimeters. In addition to securing the hub portions 57 and 58 to the discs 55 and 56, the bolts 59 also secure identical, but oppositely facing, hub portions 60 and 61 of the rear wheels 30 and 33 respectively to the two discs 55 and 56. As will be evident from FIG. 6 of the drawings, the substantially flat annular parts of the hub portions 57 and 58 are sandwiched by the bolts 59 between the corresponding parts of the hub portions 60 and 61 and the discs 55 and 56 respectively. The axle supports 52 and 53 each have an axial length that is substantially the same as the width (thickness) of the pneumatic tire of one of the wheels 31 or 32. Because of the projecting construction of the portions 57 and 58 of the hubs of the wheels 31 and 32, quite large cavities are formed "inside" those wheels so that the latter, as briefly mentioned above, effectively surround the corresponding supports 52 and 53.

A combined towing and scraping member 62 is fastened to the bottom of the differential housing 4 and has a width which is substantially the same as that of the rear part of the frame 1 which comprises said housing 4. The member 62 is of plate-like formation and has a leading substantially horizontal portion, which is rigidly secured to the housing 4, whose length, in the direction A, is substantially the same as that of the radius of one of the rear driven ground wheels that are collectively indicated by the reference 5. The member 62 comprises a downwardly and rearwardly inclined portion which (see FIG. 2) commences at a location just in front of the axis of rotation of the wheels 5 with respect to the direction A. The rearmost end of the inclined portion is substantially in line with rear regions of the wheels 5 as seen in side elevation (FIG. 2) and is there bent over upwardly to form a small substantially horizontal portion in which a hole 63 (FIG. 6) is formed for towing purposes. The small substantially horizontal portion of the member 62 in which the hole 63 is formed is located at a height above ground level which has a magnitude of between substantially 30% and substantially 40% of the radius of one of the rear wheels 5. The member 62 has downwardly bentover stiffening rims 64 (FIG. 5) along the edges thereof that are generally parallel to the direction A and, since the width of said member 62 is substantially the same as that of the housing 4, its two rims 64 are very close to the inner side surfaces of the tires of the two wheels 31 and 32. The rims 64 of the member 62 thus perform the scraping function of that member because any significant amounts of mud or the like that may adhere temporarily to the sides of the tires in question will be stripped from those sides as they move past the rims 64. The specified magnitude of the distance of the rearmost end of the member 62 above the ground surface is such that, should at least one of the tires of the two wheels 31 and 32 become punctured or be seriously underinflated, the bulge that will occur in the lowermost region thereof will be clear of contact with the member 62.

The lower lifting links 13 of the lifting device or hitch 9 are disposed above the rearmost end portion of the member 62 (see particularly FIG. 4) and said member 62 thus also affords a lower stop that limits the possible downward movement of the links 13. Extreme rearmost ends of the two links 13 are bent over outwardly in opposite directions to form substantially plate-shaped scrapers 65 that are both disposed substantially horizontally perpendicular to the direction A, the outer extremities of said scrapers 65 being located substantially in vertical median planes of the tires of the two wheels 31 and 32 that extend parallel to the direction A. It preferred, the extremities of the scrapers 65 may be located even further apart from one another beyond the median planes that have just been mentioned. The extremities of the scrapers 65 carry end plates 66 that are formed with apertures (see FIG. 2), said end plates 66 being substantially vertically disposed and substantially parallel to the direction A. The leading edges of the plate-shaped scrapers 65 are very close to the treads of the tires of the two wheels 31 and 32 respectively and, in most positions of the lifting device or hitch 9, said leading edges are at a higher horizontal level than are the corresponding rear edges. It will be appreciated that the inclinations of the scrapers 65 to the horizontal will vary in accordance with the angular positions of the lower lifting links 13 about the pivot pins 14.

The transverse supporting beam 16 carries two elongated and arcuately curved scrapers 67 that are both of channel-shaped cross-section. Each scraper 67 extends generally perpendicular to the longitudinal axis of the beam 16 and is located principally in a corresponding one of the two spaces between the wheels 30/31 and 32/33 respectively. The scrapers 67 are orientated downwardly from the beam 16 and the center of curvature of each arcuately curved scraper is spaced forwardly therefrom with respect to the direction A. Each scraper 67 is turnable about the axis of a corresponding pivot pin 68, said pivot pins 68 being substantially horizontally perpendicular to the direction A and being mounted near the opposite ends of the beam 16 by support lugs 69. Each pivot pin 68 has a corresponding coil spring 70 wound around it with said springs 70 arranged in such a way that one end of each of them is fastened to the beam 16 with the opposite end thereof secured to the scraper 67 concerned at a location spaced from the corresponding pin 68. The springs 70 thus tend to maintain the scrapers 67 in predetermined angular positions about the axes of the pins 68 and to return the scrapers 67 to those positions upon displacement thereof in either direction about the pins 68. Each scraper 67 has a width in a horizontal direction that is perpendicular to the direction A which is a little smaller than is the distance between the relatively facing side surfaces of the pneumatic tires of the rear wheels 30/31 and 32/33 respectively. In the embodiment which is being described, the width of each scraper 67 is substantially twelve centimeters. As an alternative to the channel-shaped cross-section that is illustrated for the scrapers 67, they may each have a I-shaped cross-section.

Brackets 71 (FIG. 3) depend from the frame beam 2 at locations near to the leading end of that frame beam and carry a strong horizontal pivot 72 with an axis which is substantially horizontally parallel to the direction A, said axis being contained in the aforementioned imaginary substantially vertical plane of substantialy symmetry of the tractor that extends in the direction A. The center of a front axle beam 73 is rockable about the pivot 72 between the brackets 71 and the beam 73 is normally substantially horizontally perpendicular to the direction A. The axle beam 73 is freely rockable about the pivot 72 and indirectly carries the front wheels 6. There are two pairs 74/75 and 76/77 of the front wheels 6, said two pairs being located substantially symmetrically (when they are disposed for straight travel of the tractor) at opposite sides of the imaginary plane of substantial symmetry of the tractor that has been referred to above. The pair 74/75 of front wheels is angularly steerable about the substantially vertical axis of an intervening shaft 78 and the pair of front wheels 76/77 is steerable in the same way about the similarly disposed axis of a shaft 79. Steering arms 80 and 81 are fastened to the upper ends of the shafts 78 and 79 respectively and extend rearwardly and downwardly (see FIG. 2) therefrom in rearwardly convergent (see FIG. 1) relationship. A track rod 82 pivotally interconnects the rearmost ends of the two steering arms 80 and 81 in a generally known manner and is operatively coupled to the steering wheel 28 by parts which are not illustrated in the drawings and which it is not necessary to describe for the purposes of the present invention. The lower ends of the two shafts 78 and 79 are fastened to short substantially horizontal housings 83 and 84 respectively, said housings being angularly steerable with the shafts 78 and 79 and each of them accommodating a corresponding one of the hydraulic motors (not illustrated). Each hydraulic motor drives one of the corresponding pair of front wheels 74/75 and 76/77, the hydraulic motors being supplied with oil or other fluid pressure medium from a hydraulic pump that is not illustrated in such a way that they can rotate at dissimilar speeds when, for example, the tractor is negotiating a bend.

Figure 5:
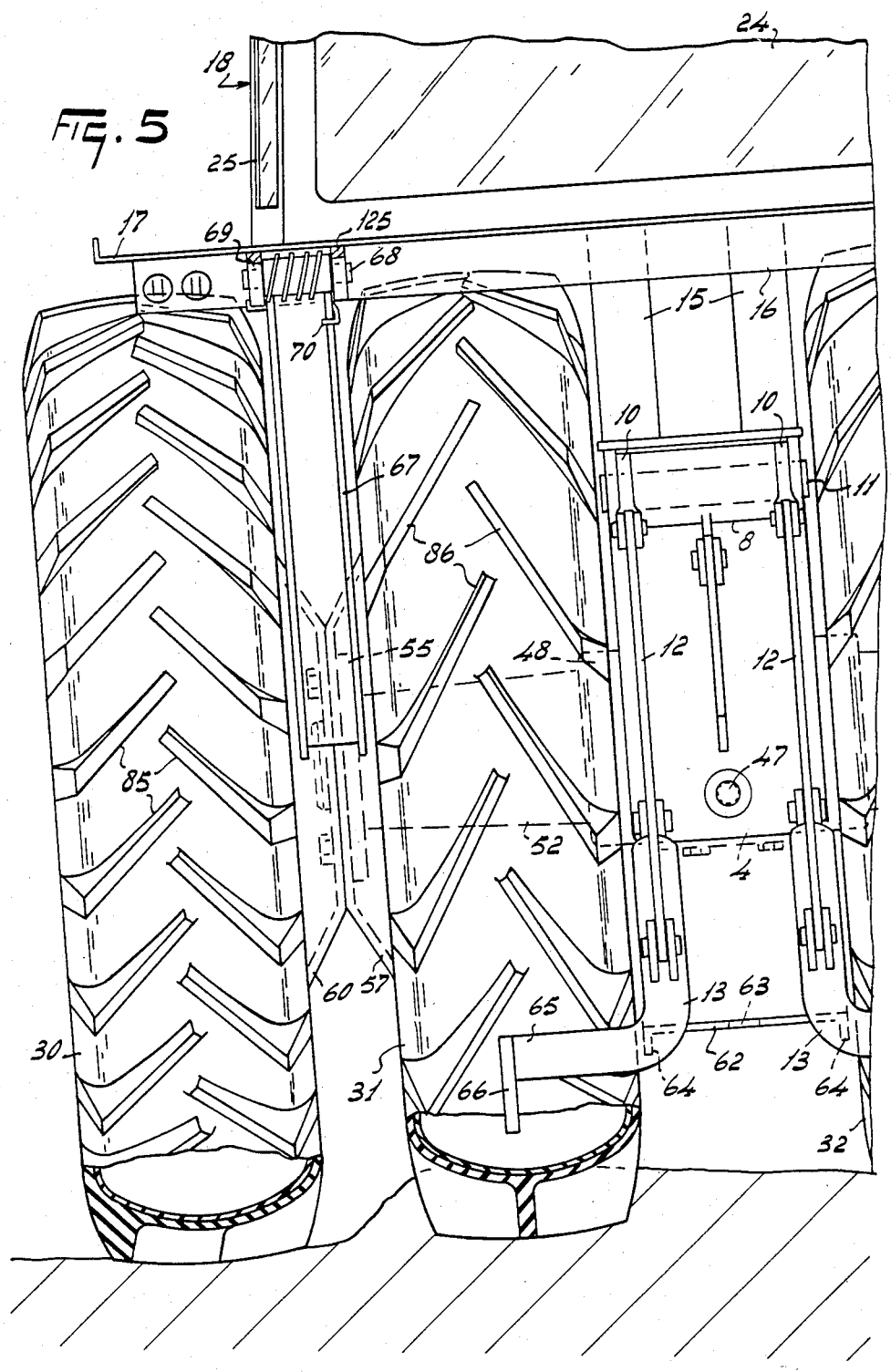
FIG. 5 is a partial rear elevation, to an enlarged scale, of the tractor of FIGS. 1 to 4, the tractor being illustrated in operation with one ground wheel in a plowed furrow.

FIG. 5 of the drawings illustrates the pair of rear wheels 30/31 at one side of the imaginary substantially vertical plane of substantial symmetry of the tractor that extends in the direction A. It will be seen from FIG. 5 that the pneumatic tires of the two wheels 30 and 31 have different treads. The tire of the outer wheel 30 has oblique tread teeth 85 and the tire of the inner wheel 31 has oblique tread teeth 86 but the radial height of each tooth 86 is between twice and three times that of each tooth 85. Moreover, the regular circumferential distance between the teeth 85 of the tread of the tire 30 is less than the regular distance between the teeth 86 of the tread of the tire 31, the teeth 86 preferably being spaced apart from one another by substantially twice the distance between immediately neighboring teeth 85.

Figure 7:
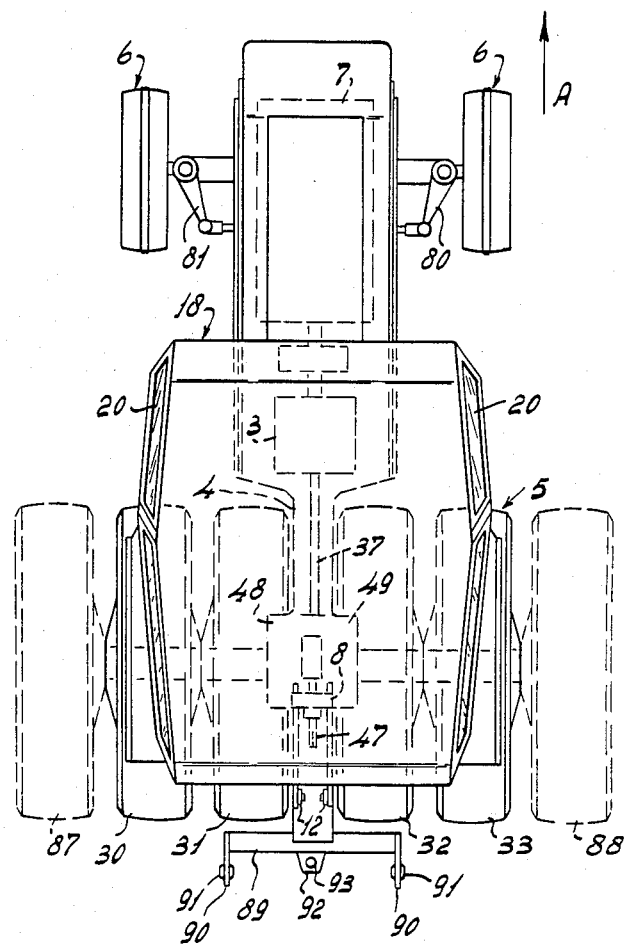
FIG. 7 is a plan view that is similar to FIG. 1 but illustrates certain modifications to the tractor of FIGS. 1 to 6.

FIG. 7 of the drawings illustrates a tractor which is basically identical to the one that has already been described above with reference to FIGS. 1 to 6 of the drawings but in which the arrangement of the rear driven ground wheels 5 is different. The row of four rear wheels 30 to 33 inclusive has an overall width in a direction perpendicular to the direction A of substantially 2.0 meters which is convenient for travel along public roads and the like. However, when the tractor is to operate in extremely adverse ground conditions, it is advantageous to employ two additional rear wheels 87 and 88 alongside the rear wheels 30 and 33 respectively. The overall width of the row which then comprises six of the wheels 5 is increased to substantially 3.0 meters. Each of the two wheels 87 and 88 has a tire width (thickness) of substantially 38 centimeters and distances of substantially twelve centimeters are left between the facing surfaces of the tires of the wheels 30/87 and 33/88 respectively. Once again, in the embodiment of FIG. 7, the distance between the tires of the two wheels 31 and 32 that are located at immediately opposite sides of the differential housing 4 is substantially 24 centimeters. Moreover, output or half shafts of the differential again project axially through internal cavities of the wheels 31 and 32 but, in this case, they also project through internal cavities of the respectively immediately neighboring wheels 30 and 33. The additional wheels 87 and 88 at the opposite ends of the row are, when fitted, secured to the wheels 30 and 33 in substantially the same manner as has already been described with reference to FIG. 6 of the drawings for the connections between the wheels 30/31 and 33/32. However, it will be noted that, to this end, the wheels 30 and 33 require to be furnished with hub portions that are similar to the portions 57/58 and 60/61, at both their opposite sides or to be provided with separate auxiliary hub portions. FIG. 7 illustrates the provision of single front ground wheels 6 at opposite sides of the frame 1 but it is, of course, possible to provide the wheels 6 in pairs as has already been described with reference to FIGS. 1 to 6 of the drawings.

In the embodiment of FIG. 7, the towing and scraping member 62 is of a different construction to that which has been described above. A rearmost end portion of the member 62 has a scraper 89 rigidly secured to it so as to extend substantially horizontally perpendicular to the direction A. It will be noted from FIG. 7 that the opposite free ends of the scraper 89 are located beyond substantially vertical median planes of the tires of the two wheels 31 and 32 that extend parallel to the direction A. The member 62 itself once again has the previously described rims 64 that co-operate scrapingly with the facing inner side surfaces of the tires of the two wheels 31 and 32. The extremities of the scraper 89 carry end plates 90 that both extend substantially vertically parallel to the direction A. The end plates 90 project rearwardly from the scraper 89 with respect to the direction A and are provided with substantially horizontally aligned rotatable eyes 91 which surround holes to accommodate shafts, bolts of the like that enable connections to be made to various implements and tools. A lug 92 projects rearwardly from the scraper 89 at a location centrally across the width of the tractor and is formed with a hole 93 for towing purposes, said apertured lug 92 constituting a towing member or hook. When, as illustrated in FIG. 7, only single front ground wheels 6 are provided, those ground wheels are undriven and serve only supporting and steering functions.

Figure 8:
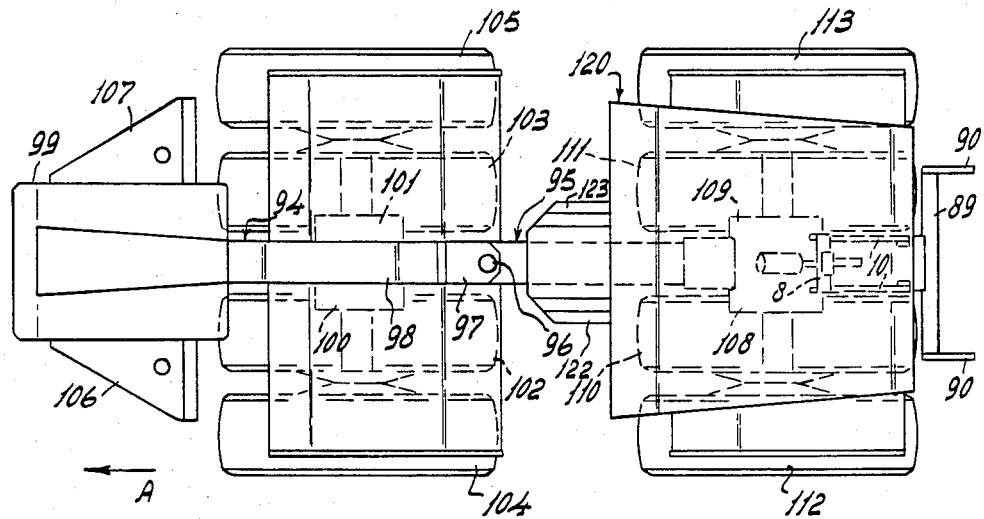
FIG. 8 is a plan view of an alternative agricultural tracor constructed in accordance with the invention.
Figure 9:
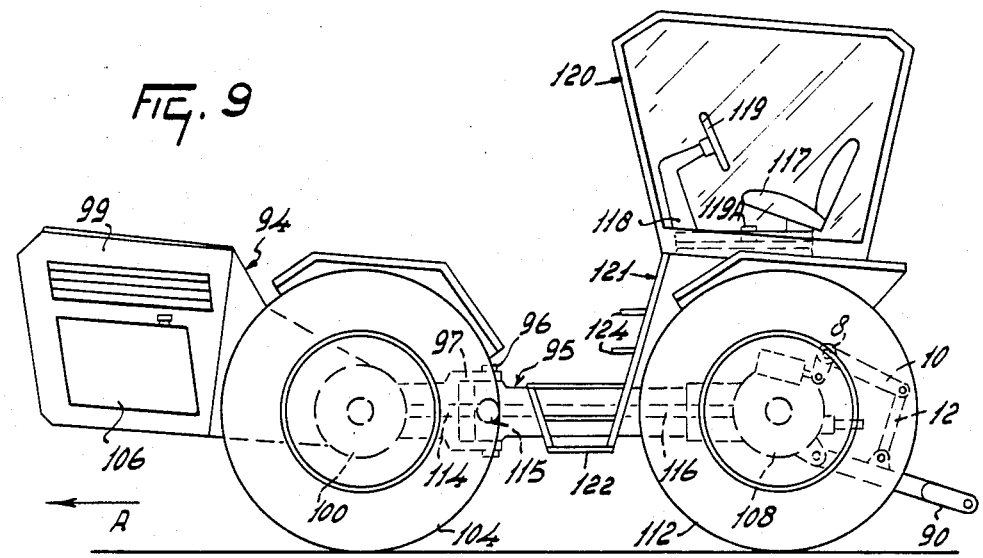
FIG. 9 is a side elevation of the tractor of FIG. 8.

FIGS. 8 and 9 of the drawings illustrate a tractor having a frame which comprises two relatively pivotable portions 94 and 95. The front portion 94 with respect to the direction A is turnable relative to the rear portion 95 about the substantially vertical axis of a strong bipartite pivot 96. The front frame portion 94 comprises a hollow beam 98, the rearmost end of that beam 98 with respect to the direction A being furnished with a fork 97 the limbs of which support the two parts of the strong pivot 96. The leading end of the beam 98 with respect to the direction A supports an internal combustion engine 99 of the tractor. The beam 98 is provided, at locations between the pivot 96 and the engine 99, with substantially symmetrically arranged lateral projections 100 and 101, said projections 100 and 101 being similar in construction and function to the previously described projections 48 and 49. Once again, a differential is located inside the hollow beam 98 and partially within its projections 100 and 101, said differential being driven from a shaft which extends from the torque converter to the differential. The torque converter is coupled to the output of the engine 99 and is not shown in the drawings. Output or half shafts extend coaxially in opposite directions from the projections 100 and 101 and have hub portions of front ground wheels 102 and 103 releasably secured to discs at their outer ends. Two further front ground wheels 104 and 105 are arranged beyond the ground wheels 102 and 103 respectively, the connections between the hub portions of the wheels 102/104 and 103/105 being the same as has already been described with particular reference to FIG. 6 of the drawings. Thus, the projections 100 and 101 extend into the internal cavities of the wheels 102 and 103 respectively together with the half shafts or output shafts of the differential. As seen in side elevation (FIG. 9), the strong pivot 96 is located very close to the rearmost extremities of the row of wheels 102 to 105, with respect to the direction A, the engine 99 being located wholly in front of said row of wheels relative to the same direction.

Two tanks 106 and 107 which are arranged to contain liquid fuel for the engine 99 are disposed in symmetrical relationship at the front of the tractor, said tanks being secured to opposite substantially vertical side walls of a housing of the engine 99. The fuel tanks 106 and 107 are thus also located wholly in front of the row of wheels 102 and 105 with respect to the direction A. The two tanks 106 and 107 project from opposite sides of the housing of the engine 99 and, as seen in plan view (FIG. 8), each of them is of substantially right-angled triangular configuration. As seen in FIG. 8, the "opposite" sides of the triangles coincide with the substantially vertical side walls of the engine housing, the "adjacent" sides of the triangles projecting perpendicularly from said side walls at the rear of the "opposite" sides and the two "hypotenuses" are in forwardly convergent relationship with respect to the direction A and substantially intersect the "opposite" sides at the fronts of the triangles.

The leading end of the rear frame portion 95 is engaged around the strong pivot 96 between the upper and lower limbs of the fork 97. The rear frame portion 95 has substantially the same width as does the beam 98 that forms part of the front frame portion 94, said width preferably being between substantially 20 centimeters and substantially 40 centimeters, inclusive. The engine housing that is supported by the beam 98 has, as can be seen in FIG. 8 of the drawings, a considerably greater width and parts that are carried by the rear frame portion 95 are also of greater width. The frame portion 95, which is of hollow formation, is provided with substantially symmetrically disposed opposite lateral projections 108 and 109 close to its rear end with respect to the direction A. The projections 108 and 109 form part of a differential housing and are similar in construction to the projections 48/49 and 100/101 that have been referred to above. The projections 108 and 109 extend into internal cavities of two rear ground wheels 110 and 111 together with the axle housings of half shafts or output shafts of the last-mentioned differential. Two further rear ground wheels 112 and 113 are mounted alongside the ground wheels 110 and 111 respectively to form a row of four rear ground wheels, the connections between hub portions of the wheels 110 and 112 and the wheels 111 and 113 being effected in the same manner as has already been described above with particular reference to FIG. 6 of the drawings. The hollow frame beam that principally affords the rear frame portion 95, together with its projections 108 and 109, is substantially the equivalent of the differential housing 4 and its projections 48 and 49. Similarly, the rear ground wheels 110 and 111 correspond to the rear ground wheels 31 and 32 of the first embodiment. It will, however, be noted that, in the embodiment of FIGS. 8 and 9 of the drawings, part of the rear frame portion 95 is disposed between the first row of front wheels 102 to 105 inclusive and the rearwardly spaced second row of rear wheels 110 to 113 inclusive.

The sizes of the pneumatic tires of the wheels 102 to 105 and 110 and 113 and the distances between them may conveniently be the same as has already been described with reference to the rear ground wheels 5 of the embodiment of FIGS. 1 and 6 of the drawings or to the embodiment of FIG. 7 thereof. The same is, of course, true of the wheels themselves. Similarly, the different tread patterns of the tires of the inner wheels 31 and 32 as compared with those of the tires of the outer wheels 30 and 33 may advantageously be employed for the inner wheels 102, 103, 110 and 111 as compared with the outer wheels 104, 105, 112 and 113. FIGS. 8 and 9 illustrate the provision of a rear lifting device or hitch that incorporates the previously described member 62, the scraper 89 and the apertured end plates 90. However, if preferred, the rear lifting device or hitch of the embodiment of FIGS. 8 and 9 of the drawings may also incorporate a rear towing hook in the form of the apertured lug 92 that is illustrated in FIG. 7.

As mentioned above, the output shaft of the engine 99 drives a torque converter that is not illustrated and, in turn, the torque converter is arranged to rotate an output of driving shaft 114 that extends substantially horizontally rearwardly therefrom. The rearmost end of the driving shaft 114 is provided with a universal joint 115 the center of which is coincident with the axis that is defined by the separate coaxial upper and lower portions of the strong pivot 96. The universal joint 115 is connected to the front of a further driving shaft 116 that extends rearwardly therefrom into the differential housing from which the rear wheels 110 to 113 inclusive are driven. Thus, all eight of the ground wheels 102 to 105 and 110 to 113 can be driven simultaneously.

A driving seat 117 is mounted on a frame 118 that also supports a steering wheel 119 and other controls (not illustrated) for the operation of the tractor. The frame 118 and the parts which it carries are turnable through substantially 180° about an upright pivot 119 A between the position illustrated in FIG. 9 of the drawings in which a driver occupying the seat 117 faces forwardly with respect to the direction A and a position in which he will face rearwardly with respect to that direction. Means (not illustrated) is provided to retain the frame 118 in either of the two positions that have just been mentioned. In the position of the frame 118 that is illustrated in FIG. 9 of the drawings, the driving seat 117 is located substantially exactly vertically above the common axis of rotation of the rear ground wheels 110 to 113 inclusive whereas, when the other possible operative position of the seat 117 is employed, said seat will be located above front regions of the wheels 110 to 113 inclusive as seen in side elevation and with respect to the direction A. The seat 117, the steering wheel 119 and the other controls (not shown) are enclosed in a driving cabin 120 that has a front door (not shown). Access to the front door is by way of a flight of steps 121 which comprises rungs 122 and 123 that are located in a symmetrical manner at opposite sides of the rear frame portion 95 and further rungs 124 that are located substantially centrally above the frame portion 95 to terminate near the foot of the front door of the cabin 120. Each of the rear driven ground wheels in each of the embodiments that has been described has an overall diameter which should not be less than substantially 100 centimeters and which is advantageously between substantially 140 and 180 centimeters. A diameter of substantially 150 centimeters is employed in the examples which have been specifically described.

High powered tractors that can exert a strong driving torque on their driven ground wheels are often incapable of transforming that driving torque wholly into tractive effort since, for example, heavy and/or prolonged rainfall can soften the ground to such an extent that the driven wheels skid or sink into the soil surface. So-called cage wheels have been provided alongside driven pneumatically tired ground wheels that are suitable for use on public roads and that form part of the original equipment of the tractor in an effort to extend the area of contact between the wheels and the ground surface during operation on soft land but, although they improve the proportion of the driving torque that can be converted into tractive effort, their provision substantially increases the overall width of the tractor to such an extent that it cannot be driven along public roads in most countries without breaking the laws of those countries. Although it is, of course, possible temporarily to remove the cage wheels for public road transport purposes, this is tiresome and inconvenient when frequent journeys along public roads have to be made. Many known tractors have the disadvantage that their original standard widths are equal or very nearly equal to the legally prescribed maximum road transport widths of the countries of origin so that the addition of driven cage wheels or the like with a view to increasing the area of contact with soft soil when the tractor is in use makes it illegal to drive the tractor along public roads. Without the added driven cage wheels or the like, the area of contact between the original wheels and soft soil is insufficient so that the tractor cannot produce enough tractive effort to move many heavy implements and tools without skidding, wheel spin or serious sinkage into the unstable ground surface. Tractors in accordance with the invention may have a large area of contact between their tires and the soil surface so that they can produce a high tractive effort before significant wheel slip or sinkage will occur and this important advantage is realized without having an overall tractor width that infringes public road transport regulations. The overall width of that part of the tractor frame to which the driven wheels are connected is drastically reduced as compared with conventional tractors so that there is sufficient space for a row of driven ground wheels with tires, in total, which have a large area of contact with soft ground and consequently exert a low pressure upon the ground surface per unit area of tire in contact therewith. Thus, under all but the most extreme of adverse conditions, substantially all of the engine torque that is applied to the driving of the ground wheels can be utilized as tractive effort. The maximum permitted width of the tractor (for road transport purposes) is thus utilized in an optimum manner and a tractor in accordance with the invention can be used satisfactorily in soil conditions which would render the employment of a conventional tractor either very difficult and uneconomic or substantially impossible.

The engine 7 of the tractor that has been described with reference to FIGS. 1 to 6 of the drawings drives the shaft 37 by way of the torque converter 3, which may be a manual gear box, and said shaft 37 is enclosed in the housing 4 which is no greater in width (thickness) than one of the tires of one of the driven rear wheels 5. Such width should not be more than substantially 50 centimeters and it is preferred that it should be within the range of substantially 20 centimeters to substantially 49 centimeters. This small width is possible because the distance between the substantially vertical side cover plates or the like 34 of the housing 4 is determined principally by the dimensions of the bearings 35 and 36 of the shaft 37. Although the portion of the housing 4 which actually contains the differential is greater in width than is the remainder of that housing, this does not destroy the advantages of the invention because the projections 48 and 49 that partially contain the differential are entered into the hollow interiors of the inner ground wheels 31 and 32, such ground wheels being commercially available tractor ground wheels that, accordingly, do not have to be specifically built for employment with tractors in accordance with the invention. The hub portions 57 and 58 have flat parts that are located laterally beyond the general planes of corresponding sides of the tires of the wheels concerned and this enables the hub portions of two different wheels to be quickly and easily fastened to one another in abutting relationship. The distance between the flat part of each such hub portion and the general plane of the neighboring side of the tire of the wheel concerned is the principal factor in determining the distance between the tires of two immediately neighboring wheels of one of the rows of such wheels that have been described. However, it is not essential that the hub portions should have the shapes that have been described in regard to the portions 57/58 and 60/61. As an alternative, tractor wheels may be used which have hub portions comprising flat parts that are substantially coincident with, or located internally behind, the general planes of the sides of tires when fitted to the corresponding wheels. When such wheels are employed, the tires that are fitted thereon abut against one another in side-by-side relationship with substantially no space at all between them except where the housing 4 is situated. Apart from that necessary space, substantially the whole of the prescribed width (for public road transport purposes) of the tractor can be occupied by pneumatic tires and no significant amounts of mud will be able to penetrate between the abutting tires without the provision of scrapers.

It can be seen in FIG. 6 of the drawings that it would be possible to increase the width of the differential by shortening the axle supports 52 and 53, the width of said differential being effectively the distance between the outermost extremities of the lateral projections 48 and 49 of the housing 4. Such an arrangement can be made, when required, and is advantageous inasmuch as it enables larger and stronger moving parts to be employed without adding to the overall width of the rear of the tractor provided that the enlarged projections still fit with adequate clearance in the internal cavities of the wheels 31 and 32. The available space is thus used in an optimum manner. In the embodiment of FIGS. 1 to 6 of the drawings, the tractor has four of the rear driven ground wheels 5 that give an overall width of substantially 2.5 meters and, in addition, has four of the smaller front wheels 6 which latter engage the ground surface with a fairly high pressure because the engine 7 is disposed above and between them. The significant pressure with which the front wheels 6 engage the ground surface may, as briefly mentioned above, advantageously be utilized in converting the driving torque of the engine 7 into tractive effort by arranging hydraulic motors for the front wheels 6 in the housings 83 and 84.

In the embodiment illustrated in FIG. 7 of the drawings, the transport width (without the wheels 87 and 88) is substantially 2.0 meters and the addition of the wheels 87 and 88 increases that width to substantially three meters, the latter being legally allowable on public roads in many countries and being possible under special licence in others. When the wheels 87 and 88 are mounted in their operative positions as shown in FIG. 7 of the drawings, the tractor has six driven rear wheels.

The tractor that is illustrated in FIGS. 8 and 9 of the drawings has eight driven ground wheels which are engaged in a front row and a rear row with each row comprising four of the wheels, the overall width of the tractor being within the legally allowed limits for travel on public roads. However, if desired, each of the two rows of four ground wheels may have two further ground wheels added to its opposite ends to give a total of twelve ground wheels arranged in two rows of six wheels each in the same manner as has already been described with reference to the rear ground wheels of the embodiment of FIG. 7. Once again, it is possible to dispose a larger than usual number of driven ground wheels within a limited width since the shafts 114 and 116 are inside a narrow frame that has a width of between substantially 20 and substantially 50 centimeters, said frame extending from the engine 99, which is located at the front of the tractor, rearwardly between the front ground wheels 102 to 105 to the differential for the rear ground wheels 110 to 113. The very narrow frame, which is afforded principally by hollow beams that accommodate driving shafts, has the advantage that, if required, more than two rows of driven ground wheels could be provided. Thus, in any one of the three embodiments that has been described, a third row of four or six closely adjacent driven ground wheels could be provided thus further reducing the pressure per unit area of contact between each tire and the ground surface. Even in very soft or waterlogged soil, sinkage can thus be reduced to an extent that does not interfere significantly with operation and it is almost always possible to transform all of the engine output that is available for that purpose into tractive effort.

Generally speaking, the grip of pneumatic tires upon the ground is enhanced if those tires have tread patterns which exhibit large teeth and tractors that are employed in plowing operations are frequently furnished with such tires. However, pneumatic tires that have tread patterns with teeth of large radial extent are expensive. The arrangement shown in FIG. 5 of the drawings can reduce this expense because the penumatic tires of the outermost wheels 30 and 33 of the row of four wheels 30 to 33 inclusive are tires whose treads have teeth 85 of comparative small radial extent, said teeth being, however, relatively close together around the circumference of the tire. The teeth 86 of the treads of the tires of the inner wheels 31 and 32 are teeth of relatively large radial extent so that said tires are thus of the expensive kind discussed above, the teeth being spaced apart, however, around the circumference of each tire by greater distances than are the teeth 85 of the tires of the wheels 30 and 33. FIG. 5 of the drawings illustrates the tractor in use in a plowing operation with one of the outer wheels 30 travelling in an already plowed furrow whereas the immediately neighboring wheel 31, that is of the same overall diameter, travels on unplowed soil immediately to one side of the furrow. The large teeth 86 of the tire of the wheel 31 penetrate quite deeply into the soil and can transform all or most of the applied torque into tractive effort. The smaller teeth 85 of the tread pattern of the tire on the wheel 30 do not sink into the furrow to any great extent and are quite adequate for the purpose in view thus making it unnecessary to provide the wheel 30 (or the wheel 33) with a more expensive tire having the teeth 86 of larger radial extent. Since the wheel 30 travels in the already formed furrow, the plow does not need to be markedly offset in position relative to the path of travel of the tractor and this enables the tractor driver to steer a straight course without exerting a strong corrective effort to one side on the steering wheel 28 because the plow is nearer to the imaginary substantially vertical plane of substantial symmetry of the tractor that extends in the direction A than is conventional. If the land to be plowed is very soft, with the result that the tractor tends to tilt to one side beyond the inclination illustrated in FIG. 5, the peripheral surface of the tire of the wheel 30 from which the teeth 85 project will come into substantially direct contact with the ground surface which latter will then give a greater degree of support. Tilting to a dangerous extent is thus prevented. Since the tire of the wheel 30 has a large number of the teeth 85, the tire is able to transform quite a high torque into tractive effort as soon as the teeth 85 in a lower arc of the tire of significant angular extent have penetrated into the soil.

Figure 2:
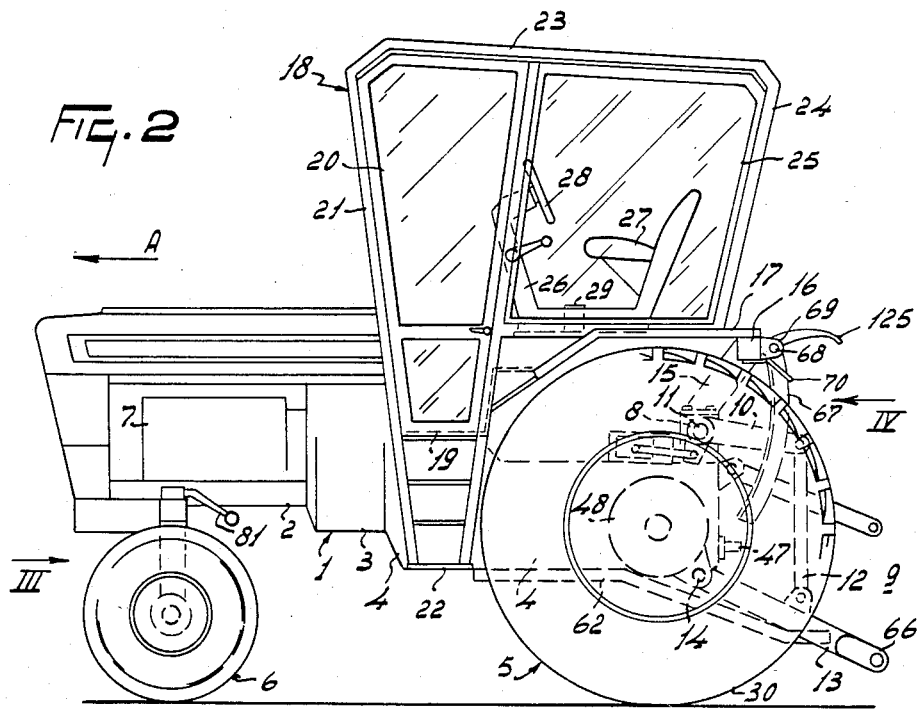
FIG. 2 is a side elevation of the tractor of FIG. 1.
Figure 3:
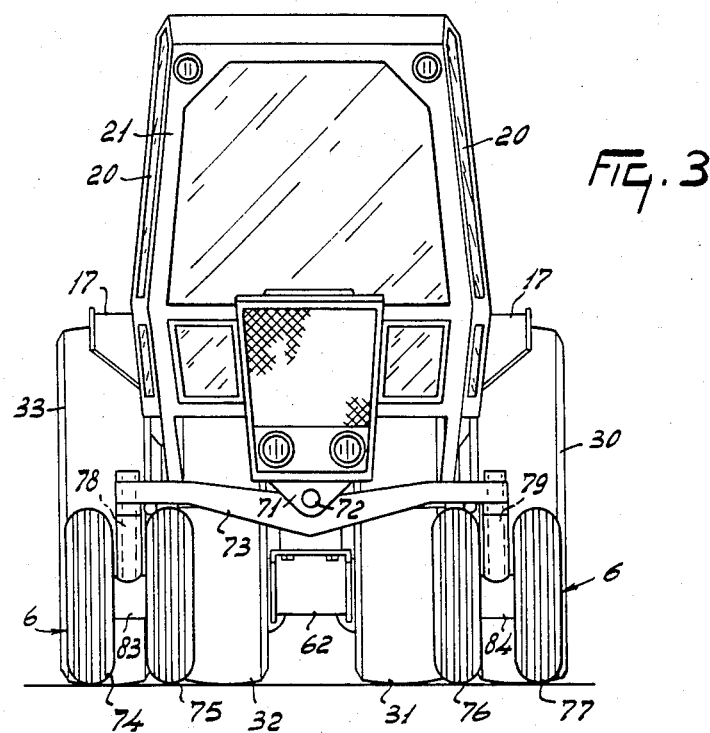
FIG. 3 is a front elevation as seen in the direction indicated by an arrow III in FIG. 2.
Figure 4:
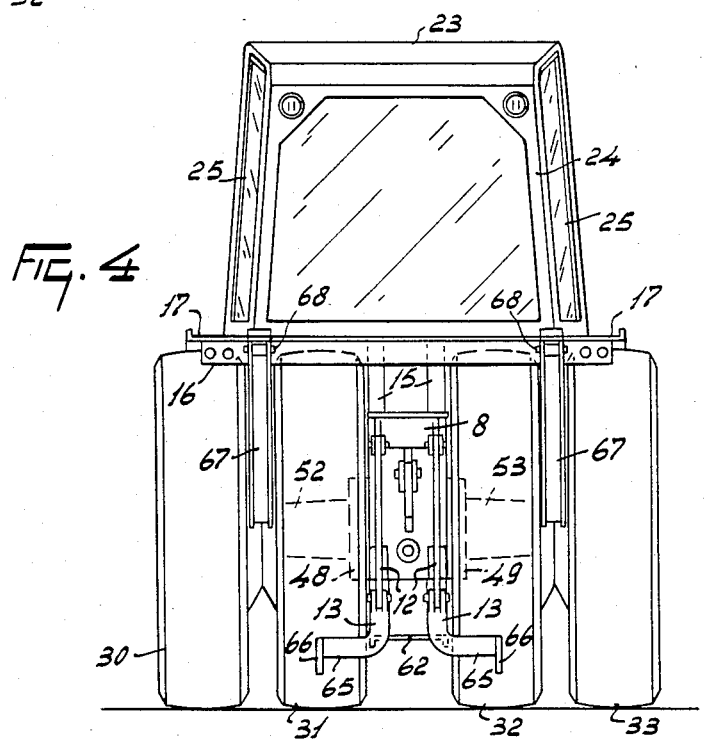
FIG. 4 is a rear elevation as seen in the direction indicated by an arrow IV in FIG. 2.

The scrapers 67 between the tires of the wheels 30/31 and those of the wheels 32/33 and also the scrapers that are provided between the tires of similarly disposed wheels in the other embodiments act to scrape off mud and lumps of soil from the immediately neighboring sides of the tires of the wheels concerned. It can be seen from FIG. 2 of the drawings that each scraper 67 covers the whole radial extent of the two tires with which it cooperates so that the sides of the tires in question are kept free of large accumulations of mud throughout operation of the tractor. Owing to the arcuately curved formation of the scrapers 67 that initially (as seen in side elevation—FIG. 2) extend substantially vertically downwards and then forwardly towards the common axis of rotation of the rear ground wheels, there will be a tendency for mud and the like scraped from the tires to travel upwardly along the scrapers 67 until it moves outwardly beyond the treads of the tires of the wheels concerned. Much of the mud will drop away to the ground surface when it reaches this location, or previously, and any that does not do so will be displaced rearwardly along the bottom of a corresponding curved guide 125, said guides 125 being substantially horizontally disposed but, as can be seen in FIG. 2 of the drawings, initially projecting rearwardly and upwardly to a small extent from the tops of the corresponding scrapers 67 to terminate in downwardly bent-over portions. The guides 125 are rigidly secured to the support lugs 69. The spring-loaded mounting of the scrapers 67 enables them to deflect about the corresponding pivot pins 68 to avoid damage in the event of, for example, a stone or the like becoming jammed between the tires of the corresponding wheels 30/31 or 32/33.

The rims 64 of the towing and scraping member 62 that is rigidly secured to the bottom of the housing 4 lie very close to the inner side surfaces of the tires of the wheels 31 and 32 and mud and the like scraped from those side surfaces by the rims 64 will sooner or larger drop back onto the ground surface between the wheels 31 and 32. There is a tendency for mud and the like scraped off by the rims 64 to move away from the tires concerned towards the center of the member 62 so that, generally speaking, when that mud falls back to the ground surface, it will be clear of contact with the tires of both of the wheels 31 and 32. The rims 64 stiffen the plate-shaped towing and scraping member 62 and tend to prevent bending of the latter when the member is used as a towing hook by employing the hole 63 that is formed therein. In particular, the rims 64 tend to prevent upward deflection of the member 62. The scrapers 65 that can be seen best in FIGS. 4 and 5 of the drawings are arranged to shed adhering mud and the like from at least the inner teeth 86 of the tires of the two wheels 31 and 32 because the plates 66 at the ends of the scrapers 65 are located in, or just beyond, the median planes of the tires of the wheels 31 and 32 that extend parallel to the direction A. The end plates 66 are employed for the connection of implements or tools during the use of the tractor and, if desired, the scrapers 65 can be extended outwardly beyond them to embrace substantially the whole of the width (thickness) of the tire of each of the two wheels 31 and 32. The scrapers 65 cooperate with the threads of the tires of the wheels 31 and 32 in the manner of butter curlers and the removed mud curls away downwardly and rearwardly behind the scrapers 65 to fall back to the ground behind the tires.

In the embodiments of FIGS. 7 to 9 of the drawings, the member 62 is not rigidly secured to the tractor frame 1 but forms part of the rear lifting device or hitch of the tractor, the member 62 being provided at the back with the scraper 89 which scraper extends effectively throughout the width of the treads of the tires of the wheels 31 and 32 or 110 and 111. The scraper 89 may be extended laterally, if desired, to co-operate also with the threads of the tires of at least the wheels 30 and 33 or 112 and 113. The scraper 89 also serves as a support for the end plates 90 to which an implement or tool can be connected employing the eyes 91. Scrapers that are substantially identical to the previously described scrapers 67 may be arranged between the closely neighboring tires of the pairs of ground wheels in the embodiments of FIGS. 7 to 9 of the drawings and, in the embodiment of FIGS. 8 and 9, the fork 97 that lies between the tires of the wheels 102 and 103 may also carry a laterally disposed scrapper (not shown) for keeping the treads of the tires 102 to 104 inclusive clean. As previously mentioned, the rear scraper 89 may be increased in width so that it will co-operate also with the treads of the tires of the wheels 112 and 113.

In the embodiment of FIGS. 1 to 6 of the drawings, the engine 7 is located above and between the front ground wheels 6 so that the pressure of those wheels on the ground is guite high and it can be useful, as described, to arranged them so as to be drivable. However, in order that the pressure of the rear wheels 5 upon the ground should not be too low, other parts of the tractor are arranged near to the common axis of rotation of the rear ground wheels. Thus, the driving cabin 18 and the driving seat 27 are arranged substantially directly above the axis of rotation of the rear wheels 5. In the embodiment of FIGS. 8 and 9 of the drawings, the engine 99 is located in front of the ground wheels 102 to 105 with respect to the direction A and thus tends to reduce the pressure of the rear wheels 110 to 113 upon the ground surface. In order to compensate for this, the driving chain 120, the driving wheel 117, the controls of the tractor and the rear lifting device or hitch thereof are all located above, or close to, the common axis of rotation of the rear ground wheels.

The driving cabin 18 of the embodiments of FIGS. 1 to 7 of the drawings contains the driving seat 27 and also the cabin floor portion 19 which is at a lower level. The distance between the cabin floor portion 19 and the roof 23 of the cabin is such that a person whose height is not more than substantially 1.75 meters can stand upright in the cabin and preferably at a location alongside one of the doors 20 so as not to impede the forward view in substantially the direction A of an operator occupying the seat 27.

It will be noted from FIGS. 8 and 9 that the driving cabin 120 is wider in front than at the rear and extends over rear wheels 110 and 111 and partly over outside rear wheels 112 and 113 so that an operator in cab 120 has an unobstructed view between forward wheels 102 and 104 on one side and between forward wheels 103 and 105 on the other side to approximately where such wheels bear on the ground. This is also true of the ground areas immediately adjacent the inboard sides of wheels 102 and 103 due to the narrow width of beam 98.

The front and rear portions 94 and 95 of the frame of the tractor that has been described with reference to FIGS. 8 and 9 of the drawings are relatively pivotable about the substantially vertical axis that is defined by the strong pivot 96 and relative angular displacement of the two frame portions 94 and 95 about said axis enables the tractor to be steered from the wheel 119. Vehicle steerability in this general manner is known per se and, accordingly, the parts that enable it to be effected are not illustrated in FIGS. 8 and 9 of the drawings and do not need to be described for the purposes of the present invention. The overall diameter of each of the wheels 102 to 105 and 110 to 113 of the tractor of FIGS. 8 and 9 of the drawings is, as previously indicated, substantially 150 centimeters and the tractor, when equipped with eight ground wheels as illustrated, has an overall width which is not greater than 3.0 meters and which is preferably substantially 2.5 meters. The tractor can thus travel along public roads without restriction.

Although various features of the tractors, described and illustrated in the accompanying drawings, will be recited in the following claims as inventive features, it is emphasized that the inventive concepts herein are not necessarily limited to those features, but include within their scope each of the parts of each tractor that has been described and illustrated in the accompanying drawings or both, taken individually and in various combinations.

I claim:

1. An articulated agricultural tractor which comprises:
    an engine having a power rating of not less than substantially one hundred horsepower;
    a frame having front and rear frame portions, a horizontal axle on each of said frame portions and at least two ground engaging wheels mounted on each said axle, each said rear wheel being aligned to follow a corresponding one of said front wheels, each said wheel being driven by said engine;
    pivot means connecting said front and rear frame portions whereby said portions are pivotable relative to each other about a substantially vertical axis;
    said engine mounted on said front frame portion and in a housing;
    a cab containing a seat and controls for an operator mounted on said rear frame portion directly above the upper aspects of each said two rear wheels as seen both from the side and above, said engine housing being completely spaced forward from the front of said cab.

2. A tractor in accordance with claim 1 wherein said engine housing is disposed directly forward of at least some of said front wheels.

3. A tractor according to claim 2 wherein said housing and said cab are spaced apart a substantial distance.

4. A tractor according to claim 2 wherein fuel tanks are mounted on each side of said housing whereby they are in a location directly forward of at least some of said front wheels.

5. A tractor according to claim 4 wherein said fuel tanks each have a triangular configuration as seen from above.

6. A tractor according to claim 1 comprising a differential for said front axle which is connected to said engine, the lowest aspects of said differential and said engine being at substantially the same level.

7. An articulated tractor which comprises:
    a power plant;
    a frame which has front and rear frame portions, a horizontal axle on each of said frame portions and a plurality of ground engaging wheels mounted on each said axle, each said rear wheel being aligned behind a corresponding one of said front wheels, each said wheel being driven by said power plant;
    an articulation joint connecting said front and rear frame portions whereby said portions are pivotable relative to each other about an upstanding axis;
    said power plant mounted on said front frame portion and enclosed in a housing which is disposed directly forward of at least the two inboard front wheels of said front wheels as seen both from the side and from the rear;
    a cab with a seat and controls therein mounted on said rear frame portion directly above said rear axle.

8. A tractor according to claim 7, wherein said housing and said cab are spaced substantially apart.

9. A tractor according to claim 8, wherein fuel tanks are mounred on each side of said housing whereby they are disposed directly forward of at least some of said front wheels.

10. A tractor according to claim 9, wherein said fuel tanks have triangular shapes as seen from above.

11. A row-crop front and rear wheel drive articulated agricultural tractor which comprises:
a power plant of not less than substantially one hundred horsepower;
a body which has a front body portion and a rear body portion, a horizontal axle on each said body portion and at least two supporting wheels mounted on each said axle, each said rear wheel being aligned behind a corresponding one of said front wheels, all of said wheels being driven by said power plant;
an articulation joint connecting said front and rear portions whereby said portions are pivotable relative to each other about a substantially vertical axis;
a housing for said power plant mounted on said front body portion which extends forward of said front wheels and the axle upon which they are mounted by a distance substantially greater than said housing extends to the rear of said axle;
at least one fuel tank mounted on said front body portion proximate such power plant;
a cab containing a seat and controls for an operator mounted on said rear body portion;
a ladder to enable the operator to climb in and out of said cab which is located on said rear body portion between said wheels and at the front aspect of said cab and behind said vertical axis of said articulation joint as seen in plan and side elevation, said ladder also being in part at the level of a tractor frame of said rear body portion, said vertical axis of said articulation joint being located substantially nearer said front axle than said rear axle as seen in plan and side elevation.

12. An articulated tractor which comprises:
an engine;
a frame having front and rear frame portions, axle means on each of said frame portions and a plurality of ground engaging wheels mounted on each said axle means, each said rear wheel being aligned behind a corresponding one of said front wheels, each said wheel being driven by said engine;
pivot means connecting said front and rear frame portions whereby said portions are pivotable relative to each other about an upstanding axis;
said engine mounted on said front frame portion forward of said front axle means;
a housing containing said engine which extends forward of said front axle means and said wheels as seen in side elevation;
at least one fuel tank mounted proximate said engine;
an operator's control center comprising a cab, a seat and controls for the operator mounted on said rear frame portion;
said upstanding axis of said pivot means being completely forward of said cab and substantially nearer said front axle than said rear axle means and substantially nearer to the rearmost aspects of said rear wheels than to the front of said housing, said pivot means extending above and below the level of both said axle means as seen in side elevation.

13. An articulated agricultural tractor which comprises:
an engine having at least about 100 horsepower,
a frame which has a front frame portion and a rear frame portion, a horizontal axle on each said frame portion and at least two ground engaging wheels mounted on each said axle, each said rear wheel being aligned to follow a path behind a corresponding one of said front wheels, each said axle being driven by said engine;
pivot means connecting said front and rear frame portions whereby said portions are pivotable relative to each other about a substantially vertical axis;
said engine mounted forward of the front axle on said front frame portion;
a cab containing a seat and controls for an operator mounted on said rear frame portion;
said cab being disposed over said rear axle whereat said cab extends both forward and to the rear of said rear axle for a substantial relative distance as seen in plan and being so controlled and arranged that the tractor's operator in said seat has visibility of approximately where said front wheels contact the ground and otherwise has good visibility to the sides and to the rear.

14. A tractor according to claim 13, wherein said cab is entirely behind said pivot means.

15. A front and rear wheel drive articulated agricultural tractor which comprises:
an engine of 100 HP or more;
a frame which has a front frame portion and a rear frame portion, a horizontal axle on each said frame portion and at least two ground engaging wheels mounted on each said axle, each said rear wheel being aligned behind a corresponding one of said front wheels, each said rear wheel connected to be driven by said engine;
said engine mounted in a housing in front of the front said axle on said front frame portion;
pivot means joining said front frame portion and said rear frame portion whereby said portions are pivotable relative to each other about a substantially vertical axis;
a cab containing a seat and controls for an operator mounted on said rear frame portion;
said wheels all being of the same diameter and the distance from the rearmost part of said front wheels to the foremost part of said rear wheels being less than said diameter and the distance from the rearmost part of said rear wheels to said axis being less than the distance from said axis to the foremost part of said housing.

16. A tractor according to claim 15 wherein said distance is about one-half of said diameter.

17. A tractor according to claim 15 wherein said cab is disposed over said rear axle whereby it extends both forward and to the rear of said rear axle for substantial relative distances as seen in plan.

18. A tractor according to claim 15 wherein said cab is entirely behind said pivot means.

19. A tractor according to claim 15 wherein a ladder for the operator to climb into and out of the cab is affixed to said cab between said wheels as seen in side elevation.

20. A tractor according to claim 15 wherein said vertical axis of said pivot means and said pivot means are located substantially between the rearmost parts of said front wheels as seen in side elevation.

21. A tractor according to claim 15 wherein said vertical axis is approximately midway between the front and rear extremities of the tractor as seen in side elevation.

22. A tractor according to claim 15 wherein a plane perpendicular to a vertical plane containing the tractor's longitudinal centerline and inclined relative to the underlying ground extends through said front wheels where they are supported on the ground, through said pivot means about midway between its upper and lower aspects, and through said controls in front of said seat in said cab whereby the operator of the tractor has the capacity to observe substantially where each said front wheel contacts the underlying ground.

23. A tractor according to claim 22 wherein said inclined plane is inclined at an angle of about 45° as seen in side elevation.

24. A tractor according to claim 15 wherein said seat is located directly vertically above said rear axle as seen in side elevation.

25. A tractor according to claim 15 wherein said engine is enclosed in a housing which extends forward of said front wheels, for more than said distance.

26. A tractor according to claim 25 wherein said housing and said cab are spaced apart.

27. A tractor according to claim 25 wherein a fuel tank in mounted on said housing.

28. A tractor according to claim 27 wherein said fuel tank is mounted to be at least in part forward of said front axle.

29. A tractor according to claim 25 wherein said engine is mounted forward of said front axle in a location to improve the traction and weight distribution of the tractor.

30. A tractor according to claim 15 wherein a differential for said front axle is connected to said engine, the lower aspects of said differential and said engine being at substantially the same level.

31. A row-crop front and rear wheel drive articulated agricultural tractor which comprises:
a power plant of not less than substantially one hundred horsepower;
a body which has a front body portion and a rear body portion, a horizontal axle on each said body portion and at least two supporting wheels mounted on each said axle, each said rear wheel being aligned behind a corresponding one of said front wheels, all of said wheels being driven by said power plant;
an articulation joint connecting said front and rear body portions whereby said portions are pivotable relative to each other about a substantially vertical axis;
said power plant mounted forward of said front axle on said front body portion;
a cab containing a seat and controls for an operator mounted on said rear body portion;
a ladder to enable an operator to climb in and out of said cab which is located on said rear body portion between said wheels and immediately forward of said rear wheels as seen in side elevation.

32. A tractor according to claim 31 wherein said vertical axis of said articulation joint is located substantially between the rearmost aspects of said front wheels as seen in side elevation.

33. A tractor according to claim 31 wherein said vertical axis is approximately midway of the overall length of the tractor as seen in side elevation.

34. A tractor according to claim 31 wherein a plane perpendicular to a vertical plane containing the tractor's longitudinal centerline and inclined to the rear relative to the underlying ground extends through said front wheels where they are supported on the ground, through said articulation joint about midway of its upper and lower aspects, and through said controls in front of said seat in said cab whereby the operator of the tractor has the capacity to observe rows in the vicinity of each said front wheel.

35. A tractor according to claim 34 wherein said inclined plane is inclined at an angle of about 45° as seen in side elevation.

36. A tractor according to claim 31 wherein said seat is disposed directly above the upper aspects of said rear wheels as seen in side elevation.

37. A tractor according to claim 31 wherein said power plant is in a housing which extends forward said front wheels.

38. A tractor according to claim 37 wherein said housing and said cab are spaced a substantial distance apart.

39. A tractor according to claim 37 wherein a fuel tank is mounted on said front body portion.

40. A tractor according to claim 39 wherein said fuel tank projects at least in part in front of said front axle.

41. A tractor according to claim 31 comprising a differential for said front axle which is connected to said power plant, the lower aspects of said differential and said power plant being at substantially the same level.

42. An articulated agricultural tractor which comprises:
an engine of at least about 100 horsepower;
a frame having front and rear frame portions, axle means on each of said frame portions and a plurality of ground engaging wheels mounted on each said axle means, each said wheel being aligned behind a corresponding one of said front wheels, each said wheel being driven by said engine;
pivot means connecting said front and rear frame portions whereby said portions are pivotable relative to each other about an upstanding axle;
said engine in a housing mounted on said front frame portion;
an operator's control center comprising a cab, a seat and controls for the operator mounted on said rear frame portion;
said upstanding axis of said pivot means being substantially between the rearmost aspects of said front wheels and said pivot means extending above and below the level of said axle means as seen in side elevation said axis being farther from the most forward aspect of said housing than the rearmost aspect of said cab.

43. A tractor according to claim 42 wherein said upstanding axis comprises a vertical axis which is approximately midway of the overall length of the tractor as seen in side elevation.

44. A tractor according to claim 42 wherein a plane perpendicular to a vertical plane containing the tractor's longitudinal centerline and inclined relative to the underlying ground extends through said front wheels where they touch the ground, through said pivot means between its upper and lower aspects, and through said controls in front of said seat in said cab whereby the operator of the tractor has the capacity to observe substantially where each said front wheel is in contact with the underlying ground.

45. A tractor according to claim 44 wherein said inclined plane is inclined at an angle of approximately 45° as seen in side elevation.

46. A tractor according to claim 42 wherein said seat is located substantially directly vertically above said rear wheels as seen in side elevation.

47. A tractor according to claim 42 wherein said engine is in a housing which projects forward of said front wheels for a substantial distance.

48. A tractor according to claim 47 wherein said housing and said cab are completely spaced apart.

49. A tractor according to claim 47 wherein at least one fuel tank is mounted proximate said engine.

50. A tractor according to claim 49 wherein said fuel tank is spaced forward of said front axle.

51. A tractor according to claim 42 wherein a differential for said front axle is connected to said engine, the lowest part of said differential and said engine being located at substantially the same level.

52. A row-crop front and rear wheel drive articulated agricultural tractor which comprises:
   an engine having a power rating of not less than substantially one-hundred horsepower;
   a frame having front and rear frame portions, a horizontal axle on each said frame portion and at least two ground engaging wheels mounted on each said axle, each said rear wheel being aligned behind a corresponding one of said front wheels, each said wheel being driven by said engine;
   pivot means linking said front and rear frame portions whereby said portions are turnable relative to each other about a substantially vertical axis;
   said engine mounted completely forward of said front axle on said front frame portion;
   a cab containing a seat and controls for an operator mounted on said rear frame portion;
   said frame, said pivot means, said front wheels, and said controls being so constructed that a plane perpendicular to a vertical plane containing the tractor's longitudinal centerline and inclined relative to the underlying ground which extends through said front wheels where they are supported on the ground, through said pivot means about midway of its upper and lower aspects, and through said controls in front of said seat in said cab whereby the operator of the tractor can see the rows immediately adjacent said front wheels.

53. A tractor according to claim 52 wherein said inclined plane is inclined at an angle of roughly 45° as seen in side elevation.

54. A tractor according to claim 52 wherein said seat is disposed directly vertically above said rear axle as seen in said elevation.

55. A tractor according to claim 52 wherein said engine is enclosed in a housing which projects for a substantial distance forward of said front wheels as seen in side elevation.

56. A tractor according to claim 55 wherein said housing and said cab are spaced apart.

57. A tractor according to claim 55 wherein a fuel tank is mounted on said front frame portion proximate said engine.

58. A tractor according to claim 57 wherein said fuel tank extends at least in part forward of said axle of said front frame portion as seen from above.

59. A tractor according to claim 52 wherein a differential for said front axle is connected to said engine, the lower aspects of said differential and of said engine being at substantially the same level.

60. An articulated agricultural tractor which comprises:
   an engine having a power rating of not less than substantially one-hundred horsepower;
   a frame having front and rear frame portions, horizontal axle on each of said frame portions and at least two ground engaging wheels mounted on each said axle, each said rear wheel being aligned to follow a corresponding one of said front wheels, each said wheel being driven by said engine;
   pivot means connecting said front and rear frame portions whereby said portions are pivotable relative to each other about a substantially vertical axis;
   said engine mounted to be spaced forward of said front axle on said front frame portion;
   a cab containing a seat and controls for an operator mounted on said rear frame portion directly vertically above said rear axle and at least in part over said rear wheels.

61. A tractor in accordance with claim 60 wherein said engine is in a housing which projects a substantial distance forward of said front wheels as seen in side elevation.

62. A tractor according to claim 61 wherein said cab is substantially wider than said housing.

63. A tractor according to claim 61 wherein a fuel tank is mounted on said front frame portion.

64. A tractor according to claim 63 wherein said fuel tank extends at least in part forward of said front axle.

65. A tractor according to claim 63 comprising a differential for said front axle which is connected to said engine, the lowest aspects of said differential and said engine being at substantially the same level.

66. An articulated agricultural tractor which comprises:
   a power plant;
   a frame which has front and rear frame portions, a horizontal axle on each of said frame portions and at least two ground engaging wheels mounted on each said axle, each said rear wheel being aligned behind a corresponding one of said front wheels, each said wheel being driven by said power plant;
   an articulation joint connecting said front and rear frame portions whereby said portions are pivotable relative to each other about an upstanding axis;
   said power plant mounted on said front frame portion spaced ahead of said front axle and enclosed in a housing which extends forward of said front wheels;
   a cab which is wider than said housing with a seat and controls therein mounted on said rear frame portion directly above said rear axle and at least in part above said rear wheels.

67. A tractor according to claim 66, wherein said housing and said cab are spaced substantially apart.

68. A tractor according to claim 67 wherein a fuel tank is mounted on said front frame portion.

69. A tractor according to claim 68, wherein said fuel tank is mounted proximate said power plant.

70. A tractor in accordance with claim 64, wherein a differential for said front axle is connected to said power plant, the lower aspects of said differential and said power plant being at substantially the same level.

71. An articulated agricultural tractor which comprises:
   an engine having a horsepower rating of one-hundred or more;
   a frame which has a front frame portion and a rear frame portion, a horizontal axle on each said frame portion and at least two ground engaging wheels having the same diameter mounted on each said axle, each said rear wheel being aligned behind a corresponding one of said front wheels, all of said wheels being driven by said engine;
   an articulation joint connecting said front and rear frame portions whereby said portions are pivotable relative to each other about an upstanding axis, said articulation joint being at levels which are both above and below the levels of said axles;
   said engine being mounted forward of said front axle on said front frame portion;
   a cab containing a seat and controls for an operator mounted on said rear frame portion;
   a differential for said front axle and a differential for said rear axle both connected to said engine, the lowest aspects of said differentials, said articulation joint, and said engine being at substantially the same level.

72. A tractor according to claim 71 wherein said engine is mounted forward of said front differential, the tractor comprising a lifting device and hitch for trailing equipment extending from the rear of the tractor, whereby the traction and weight distribution of the tractor at said front and rear wheels is more nearly uniform when said lifting device is in a loaded condition.

73. A row-crop tractor which is articulated and has front and rear wheel-drives, the tractor comprising:
   an engine;
   a frame which has front and rear frame portions, a horizontal axle on each said frame portion and at least two ground engaging wheels mounted on each said axle, each said rear wheel being aligned behind a corresponding one of said front wheels, each said wheel being driven by said engine;
   an articulation joint disposed proximate a vertical plane tangent to the rear treads of said front wheels, said frame portions being movable relative to each other about said articulation joint;
   a lifting device and hitch for trailing equipment extending from the rear of the tractor;
   said engine mounted on said front frame portion spaced forward of said front axle whereby the weight distribution and traction of the tractor are such that more weight is carried by said front wheels when the tractor is in an unloaded condition;
   a cab comprising an enclosed operator's control center which is completely to the rear of said articulation joint mounted on said rear frame portion above said rear axle whereby the operator is able to observe said lifting device and equipment mounted on said lifting device;
   said front frame portion being sufficiently narrow and said cab being sufficiently wide so that the operator of the tractor can see rows just inside said front wheels.

74. An articulated agricultural tractor which comprises:
   a power plant;
   a frame which has front and rear frame portions, a horizontal axle on each frame portion and at least two ground wheels mounted on each said axle and being so arranged that each said wheel on said rear axle is aligned behind a corresponding said wheel on said front axle, each said axle driven by said power plant;
   an articulation joint connecting said front and rear frame portions to be pivotable relative to each other about an upstanding axis;
   a differential located between said wheels mounted on said front axle, said differential connected to said power plant, said power plant being spaced forward of said front axle and projecting forward of the forward aspects of said front wheels as seen from the side, the lowest aspects of said power plant and said differential being substantially at the same level;
   said power plant mounted on said front frame portion and enclosed in a housing which projects a substantial distance forward of said wheels mounted on said front axle as seen from the side, said axis being nearer the rear of the tractor than the foremost aspect of said housing.

75. A tractor according to claim 74 wherein said wheels mounted on said front axle are at least in part directly behind said housing and the forward aspects of such wheels are substantially tangential to the adjacent surface of said housing.

76. A tractor comprising an engine and front and rear ground wheels, said ground wheels including pneumatic tires, a lifting device being provided which has link means that extend outwardly from a central region of the tractor within vertical planes which contain the side surfaces of said tires closest to said lifting device, said planes being substantially parallel to the intended direction of the tractor's forward travel, said lifting device comprising laterally directed portions extending from and rigidly connected to said link means and being located in the immediate vicinity of said pneumatic tires of said closest ground wheels, each of said laterally directed portions having a coupling member provided thereon for the attachment of implements, said laterally directed portions being rigidly connected to each other between at least the outward aspects of said link means.

77. A tractor according to claim 76 further comprising front and rear axles and having at least four said front wheels on said front axle and at least four said rear wheels on said rear axle, the width of the tractor's travel path and said front wheels and said rear wheels each being not greater than about 2.5 meters.

78. An articulated tractor comprising forward and rear portions connected by an articulation having a vertical axis, an engine in said forward portion, front and rear ground wheels supporting said respective portions and driven by said engine via respective front and rear differentials, a cab entirely enclosing a seat and steering means in said rear portion, a platform which extends over the upper aspects of said rear driven ground wheels, said platform forming the lower boundary of said cab, said seat being substantially vertically over at least two of said driven ground wheels.

79. An articulated tractor comprising two portions which are pivotably connected so as to be relatively pivotable about a vertical axis, each said portion including an axle and at least one portion including a power plant of not less than substantially one hundred horsepower, each said axle mounting at least four side-byside wheels each of which includes a pneumatic tire having a width of substantially not less than thirty-eight centimeters, each said axle including a differential in a power train between said engine and each said axle so that each said wheel is a driven wheel via a differential for its respective axle, the path of travel of the tractor having a width of not greater than substantially 2.5 meters.

80. A tractor according to claim 79 wherein the overall diameter of each said ground wheel is substantially one hundred and fifty centimeters.

81. An articulated tractor comprising two portions which are pivotably connected so as to be relatively pivotable to one another about a vertical axis, each said portion including an axle and at least one portion including an engine of not less than substantially one hundred horsepower, at least one said axle mounting at least four side-by-side wheels each of which includes a pneumatic tire, said one axle including a differential in a power train between said engine and said wheels thereon, at least all of the ground wheels mounted on said one axle having an overall diameter of substantially one hundred and fifty centimeters and a width of not less than thirty-eight centimeters, and the overall width of the tractor's path of travel being not greater than substantially 2.5 meters.

* * * * *